United States Patent [19]

Endo

[11] Patent Number: 4,716,426
[45] Date of Patent: Dec. 29, 1987

[54] METHOD OF AND APPARATUS FOR PHOTOGRAPHING MEDICAL IMAGE

[75] Inventor: Hisashi Endo, Tokyo, Japan

[73] Assignee: Yokogawa Medical Systems, Limited, Tokyo, Japan

[21] Appl. No.: 10,276

[22] PCT Filed: May 29, 1986

[86] PCT No.: PCT/JP86/00277
§ 371 Date: Jan. 9, 1987
§ 102(e) Date: Jan. 9, 1987

[87] PCT Pub. No.: WO86/07168
PCT Pub. Date: Dec. 4, 1986

[30] Foreign Application Priority Data
May 30, 1985 [JP] Japan .................... 60-116975

[51] Int. Cl.⁴ .................................... G03B 29/00
[52] U.S. Cl. ............................................ 354/76
[58] Field of Search ........................ 354/75, 76

[56] References Cited
U.S. PATENT DOCUMENTS
4,206,465 6/1980 Tamoto et al. ............... 346/107 R
FOREIGN PATENT DOCUMENTS
33/57125 4/1958 Japan .

Primary Examiner—Michael L. Gellner
Attorney, Agent, or Firm—Moonray Kojima

[57] ABSTRACT

A method of and an apparatus for photographing a medical image according to the present invention which is capable of successive photographing of a plurality of images without any labor of the operator and in a short time is characterized in that information for specifying a plurality of images to be photographed successively is registered on a frame of a display (3), and video signals of the plurality of images are supplied to a multi format camera (8) in succession with reference to the registered information by a controller (2) in order to photograph the plurality of images automatically and successively.

2 Claims, 4 Drawing Figures

METHOD OF AND APPARATUS FOR PHOTOGRAPHING MEDICAL IMAGE

DESCRIPTION

1. Technical Field

The present invention relates to a method of an apparatus for photographing a medical image obtained by an X-ray computer tomograph (hereinunder referred to as "CT") by a camera and more particularly, to a method of and an apparatus for photographing a plurality of medical images automatically and successively which are registered in advance to be photographed.

2. Background Art

As an example of medical image photographing apparatus, a CT is known. A CT is provided with an image display unit for displaying an image on the basis of video signals, the image having been subjected to processings for facilitating diagnosis, for example, window processing, ROI setting processing and image enlarging processing; and a multi format camera (hereinunder referred to as "MFC") for photographing a plurality of images on the basis of the video signals at predetermined positions of a film surface. Such an MFC includes a photographing CRT for displaying an image on the basis of a video signal supplied from the image display unit, a film setting mechanism for setting the film at a predetermined photographing position and carrying the film to a predetermined storing position after photographing, a plurality of lenses having the respective shutters which are provided between the film and the photographing CRT, and a camera controller for controlling the film setting mechanism and the shutters, etc. on the basis of the various command signals (a photographing starting signal, etc.) supplied from the outside and detection signals supplied from various sensors (a film position sensor, etc.) at the interior. These film setting mechanisms and the shutters, etc. are hereinunder referred to as the "mechanical unit" of a camera.

In such a computer tomography, during scanning and diagnosis the images displayed on the image display unit is observed, and a given image is photographed by the MFC as desired. When an image is photographed by the MFC, a key on the console panel of the image display unit is first operated by the operator to display an image to be photographed on both the display unit and the photographing CRT, and the photographing key of the console panel of the MFC is then depressed.

In such a conventional medical image photographing apparatus, when many pictures are photographed successively by the MFC, it is necessary to repeat the operation of the console panels of the image display unit and the MFC as many times as the photographing frames, which requires much labor and time of the operator.

DISCLOSURE OF THE INVENTION

Accordingly, it is an object of the present invention to provide a method of and an apparatus for photographing a medical image which is capable of successively photographing a plurality of medical images by an MFC without requiring a labor of the operator and in a short time. A method of and an apparatus for photographing a medical image according to the present invention are characterized in that information for specifying a plurality of images to be successively photographed is registered on a frame of a display unit (3), and video signals of the plurality of images are supplied to a multi format camera (8) in succession with reference to the registered information by a controller (2) in order to photograph the plurality of images automatically and successively.

BEST MODE FOR CARRYING OUT THE INVENTION

The present invention will be explained in detail in the following with reference to the accompanying drawings.

Figure 1:
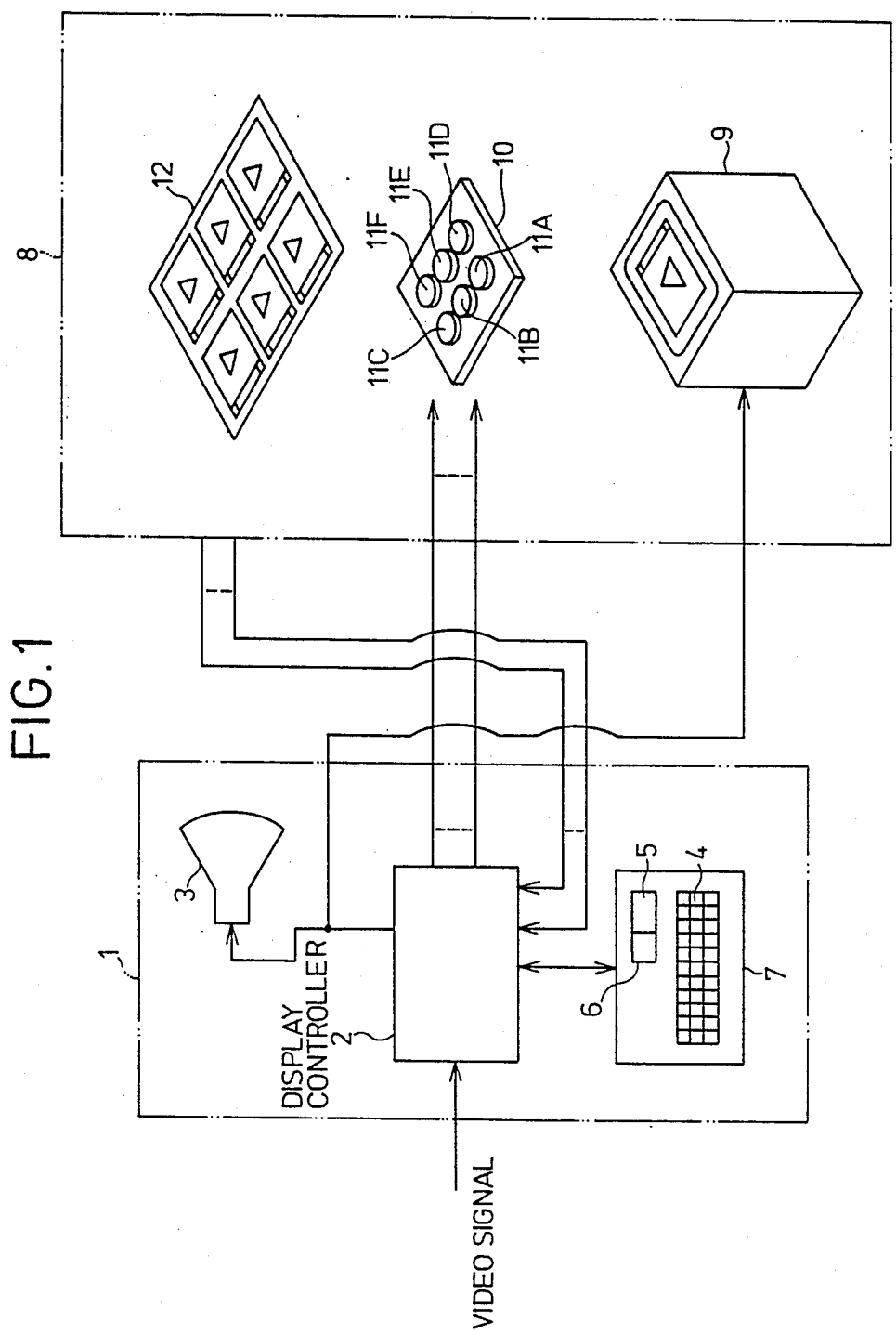
FIG. 1 schematically shows the structure of an embodiment of the present invention.

FIG. 1 schematically shows the structure of an embodiment of a medical image photographing apparatus according to the present invention. This medical image photographing apparatus is composed of an image display unit 1 and an MFC 8. The image display unit 1 includes a display controller 2 consisting of a computer, a monitoring CRT 3, and a keyboard 7 having a group of keys 4 for setting and registering an image to be photographed, for window operation, ROI setting operation, image enlarging operation, etc., a key 5 for designating automatic photographing (hereinunder referred to as "auto key"), a key 6 for starting automatic photographing (hereinunder referred to as "start key") and the like. The display controller 2 receives video signals based on projection data which are obtained by scanning an object to be examined, signals from the keyboard 7 and signals from various sensors in the interior of the MFC 8, and controls the image displaying operation of the monitoring CRT 3 and the image photographing operation of the MFC 8 on the basis of the result of predetermined data processing.

The MFC 8 includes a photographing CRT 9 which displays the image having the dark and light parts reversed with respect to the image on the monitoring CRT 3, lenses 11A to 11F which are arranged two-dimensionally and supported by a lens support plate 10, shutters (not shown) provided for the respective lenses, a film setting mechanism (not shown) for setting a film 12 at a predetermined photographing position in accordance with a control signal supplied from the display controller 2 and carrying the film to a predetermined storing position after photographing, sensors (not shown) for detecting the position of the film and the open or closed states of the respective shutters, and the like.

Figure 2:
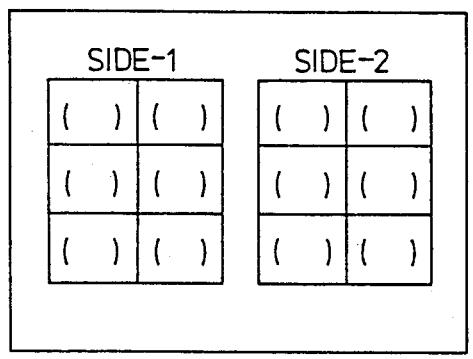
FIG. 2 shows a registration frame for registering a plurality of images to be photographed.

The photographing operation of the medical image photographing apparatus according to the present invention will now be explained with reference to FIGS. 2 to 4.

Figure 3:
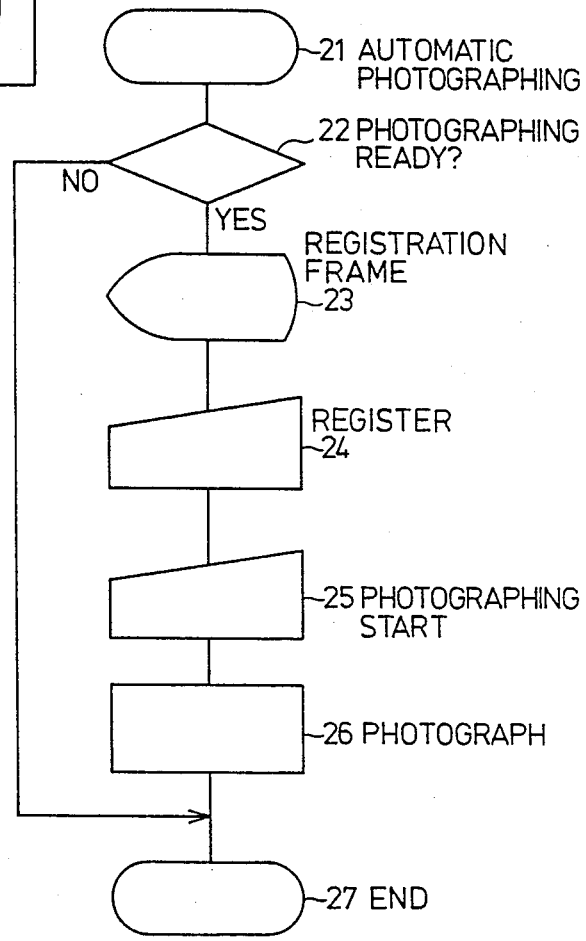
FIGS. 3 and 4 are flow charts of the photographing operation of the apparatus shown in FIG. 1.
Figure 4:
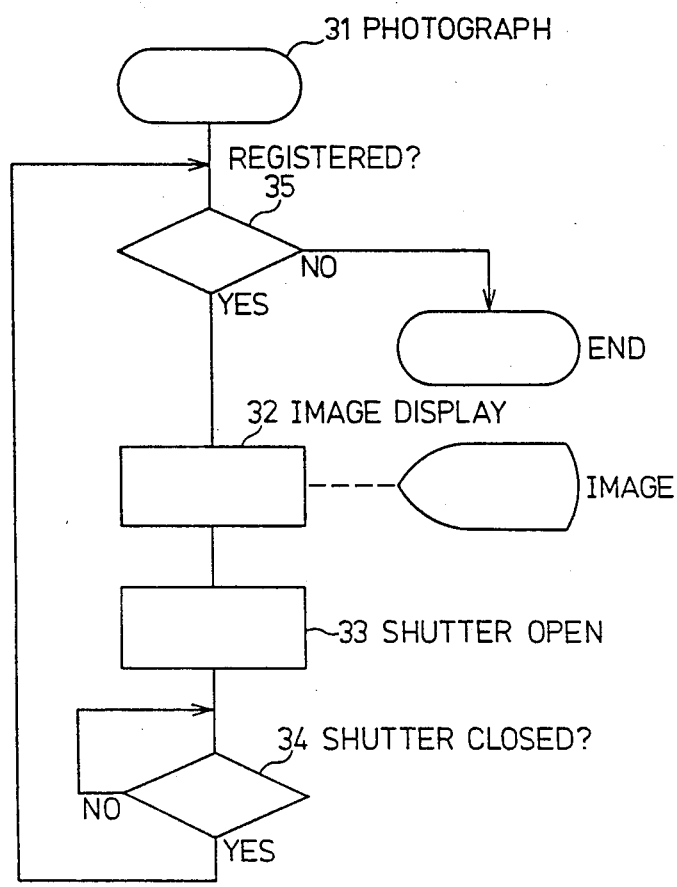

Automatic photographing is started by the display controller 2 when the auto key 5 of the image display unit 1 is depressed by the operator (21 in FIG. 3). The display controller 2 judges the signals supplied from various sensors in the interior of the MFC 8 (22 in FIG. 3), and if the MFC is ready for automatic photographing, a frame for registering the numbers of a plurality of images to be automatically photographed such as that shown in FIG. 2 is displayed on the monitoring CRT 3 (23 in FIG. 3). The frame shown in FIG. 2 displays six frames of the corresponding two films in the MFC 8 on which images are photographed. When the group of keys 4 is depressed by the operator to input the number (e.g., the number of a slice) of an image to be photographed into a desired frame on the frame shown in FIG. 2, the image to be photographed is registered in the memory in the display controller 2 (24 in FIG. 3). During this setting and registering operation, the order of registered images to be photographed and the position on the film at which each image is photographed, namely, the order of the shutters to be operated is also determined.

If the operator depresses the start key 6 in this state, automatic photographing is started (26 in FIG. 3). The operation of the automatic photographing is shown in the flow chart of FIG. 4. The display controller 2 displays the image to be first photographed on both the monitoring CRT 3 and the photographing CRT 9 (32 in FIG. 4), and opens the shutter (e.g., the shutter of the lens 11A) corresponding to this frame (33 in FIG. 4). The shutter closes after a predetermined time for giving appropriate exposure has passed. The display controller 2 detects that the shutter is closed and starts the second photographing (34 in FIG. 4). In this way the automatic photographing is repeated until the photographing of all the images to be photographed is finished (35 in FIG. 4).

Thus, all the plurality of images to be photographed which have been registered in advance by the operator have been automatically and successively photographed at desired positions on the film. Accordingly, the desired plurality of images are photographed without any labor of the operator and in a short time.

The present invention is not restricted to this embodiment. For example, images to be photographed may be set and registered while being displayed on the respective desired frames on the registration frame. The MFC may be composed of one set of a lens and a shutter so that the photographing position is successively moved in correspondence with the frame of the film. This system is sufficed with only one wiring for a signal for controlling the shutter. Furthermore, the medical image photographing apparatus may be replaced by an NMR imaging apparatus, an ultrasonic diagnostic apparatus or the like.

What is claimed is:

1. A method of photographing a medical image comprising the steps of:
    displaying on a display a registration frame for registering information for specifying a plurality of images to be successively photographed;
    registering said information for specifying said plurality of images through said registration frame on said display;
    supplying video signals of said plurality of images to a multi format camera successively with reference to the registered information; and
    photographing the plurality of images in succession which correspond to the supplied video signals by said multi format camera.

2. An apparatus for photographing a medical image having a medical image display unit (1) including an image display (3) and a display controller (2) for controlling the displaying operation of said image display, and a multi format camera (8) for photographing an image on the basis of a video signal which is supplied in common with said image display of said medical image display unit, said apparatus comprising;
    means (2, 3, 5) for displaying on said display a registration frame for registering information for specifying a plurality of images to be photographed successively;
    means (2, 3, 4) for registering said information for specifying said plurality of images through said registration frame on said display; and
    means (2, 6) for supplying said video signals of said plurality of images in succession to said multi format camera with reference to said information which has been registered through said registration frame on said display in order to successively photograph said plurality of images which correspond to said video signals.

* * * * *